Jan. 11, 1966  G. E. MILLER  3,228,291

APERTURE FORMING DRIVE MECHANISM

Filed Dec. 29, 1961  5 Sheets-Sheet 1

INVENTOR
GEORGE E. MILLER

BY
ATTORNEY

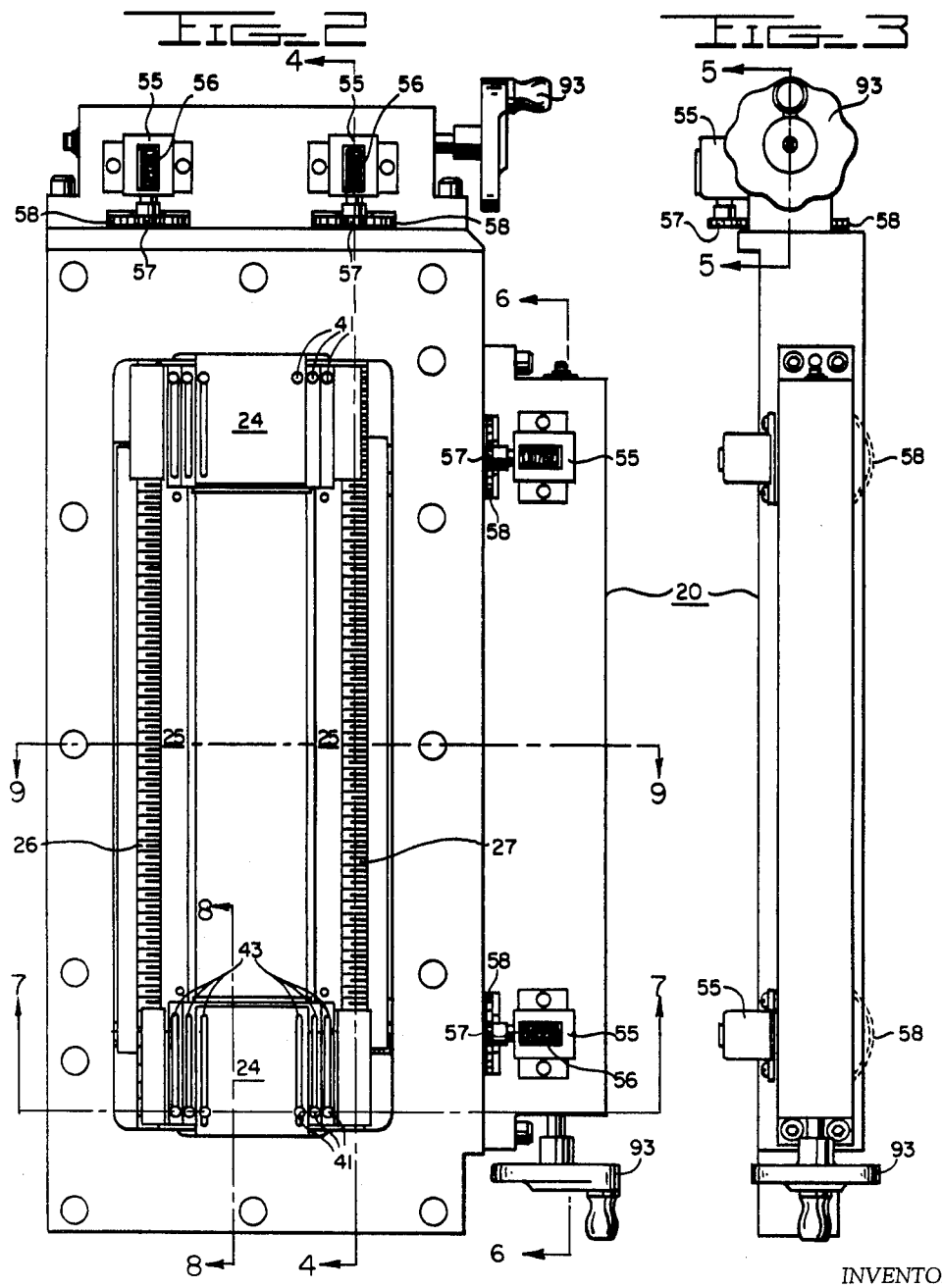

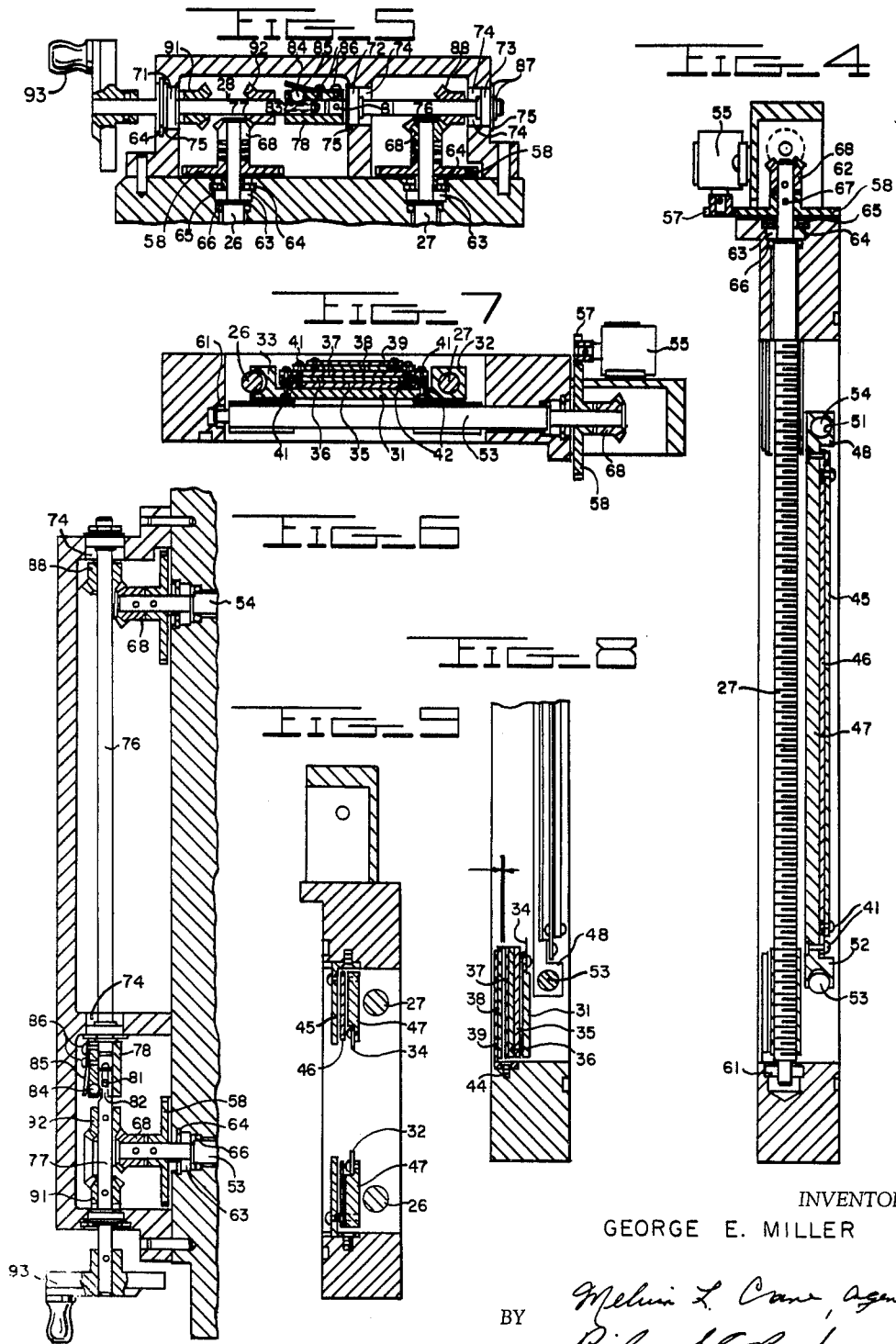

Jan. 11, 1966 G. E. MILLER 3,228,291
APERTURE FORMING DRIVE MECHANISM
Filed Dec. 29, 1961 5 Sheets-Sheet 4
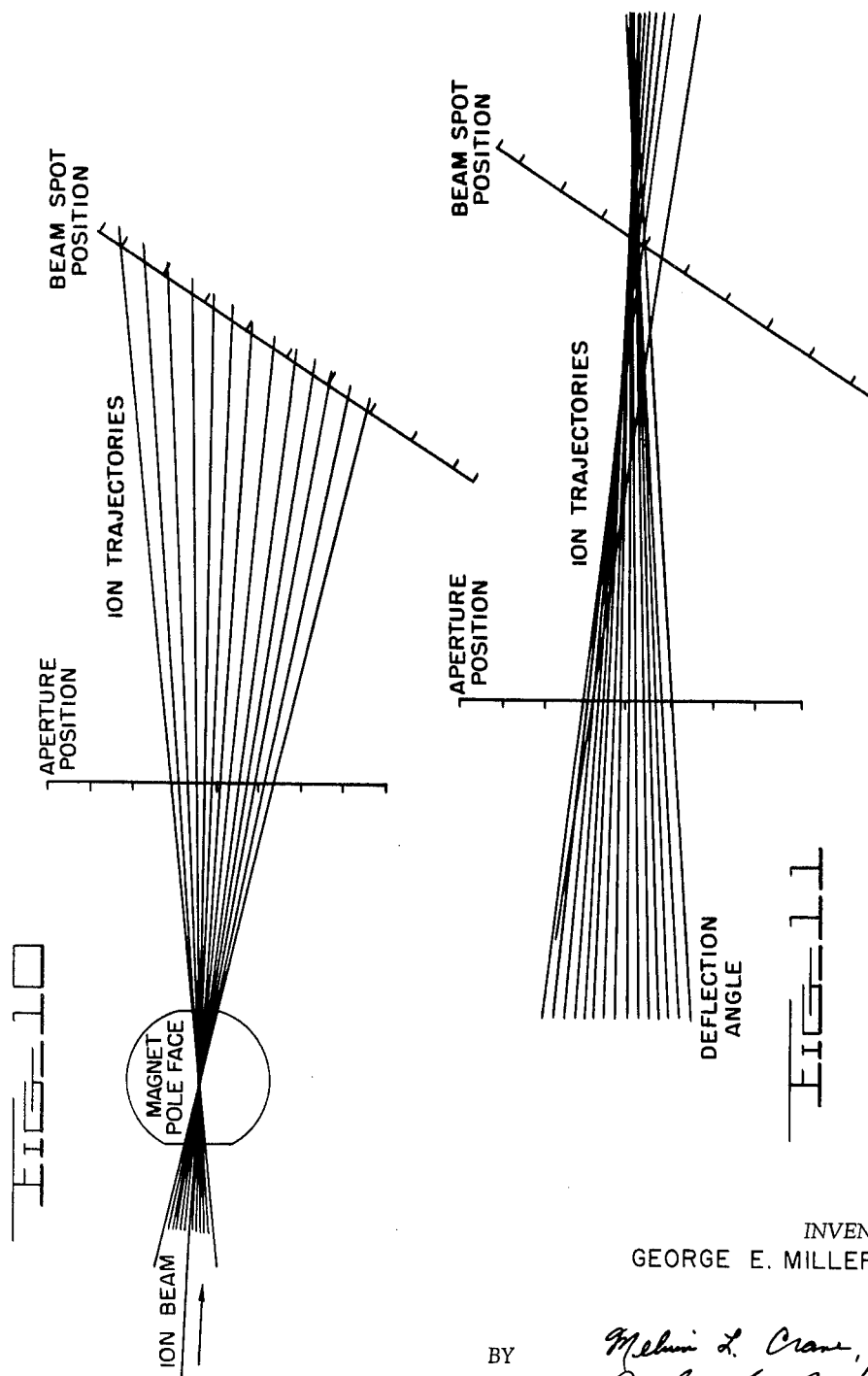
INVENTOR
GEORGE E. MILLER

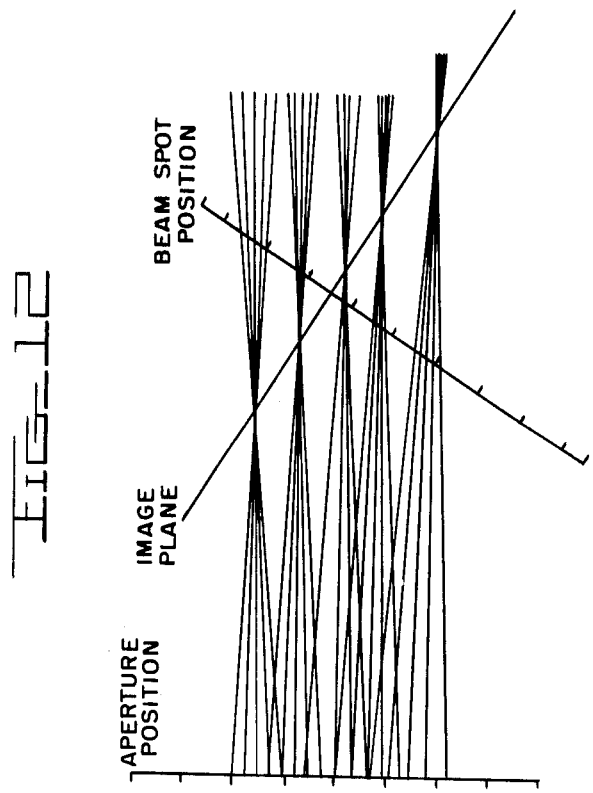

United States Patent Office 3,228,291
Patented Jan. 11, 1966

3,228,291
APERTURE FORMING DRIVE MECHANISM
George E. Miller, Oxon Hill, Md., assignor to the United States of America as represented by the Secretary of the Navy
Filed Dec. 29, 1961, Ser. No. 163,372
3 Claims. (Cl. 88—61)
(Granted under Title 35, U.S. Code (1952), sec. 266)

The invention described herein may be manufactured and used by or for the Government of the United States of America for governmental purposes without the payment of any royalties thereon or therefor.

The present invention relates to a mechanical drive means and more particularly to a drive means adapted to drive parallel driver means in the same rotational direction or in opposite rotational directions relative to each other.

The mechanical drive of the present invention can be used for many different purposes involving rotary to rorotary motion. Some uses may be to drive a plurality of driver shafts from one drive shaft, to drive parallel threaded screws threaded into movable plates to form a slit for photographic or spectrographic work or other types requiring an adjustable slit. For the purpose of explanation, the mechanical drive of the present invention will be described as a drive means for producing an accurately located aperture which is used in combination with a fluorescent screen to determine the position of an ion-ray in tracing the output beam of a charged particle lens system such as at the output of a magnetic spectrometer. The size and location of the aperture through which charged particles pass are accurately determined from direct drive counters which are driven by the driver screws and indicate both the width of the slit and location of the slit in the reference plane. In tracing a beam, one point is determined by the aperture formed by perpendicular slits and a second point is determined by a spot appearing on the fluorescent screen where the beam hits the fluorescent screen. Graduations on the fluorescent screen indicate the location of the spot and a line drawn through the spot and the aperture determines the path of a beam passing through the aperture.

It is therefore an object of the present invention to provide a simple, inexpensive, rotary to rotary drive means.

Another object is to provide a drive means for accurately positioning an aperture in a reference plane.

Still another object is to provide a device for accurately forming and positioning an aperture in a reference plane and moving the aperture within the area of the reference plane while maintaining the aperture size.

Yet another object is to provide a drive mechanism for forming an aperture at the output of an electric or magnetic focusing system for determining the ion-optical characteristics thereof.

The nature of this invention as well as other objects and advantages thereof will be readily apparent from considerations of the following specification related to the annexed drawings, in which:

FIG. 2 illustrates a front view of the aperture forming mechanism;

FIG. 3 illustrates a side view of the aperture forming mechanism shown by illustration in FIG. 2;

FIG. 4 is a cross-sectional view of the aperture forming drive mechanism taken along lines 4—4 shown by FIG. 2;

FIG. 5 is a sectional view which illustrates a drive mechanism for the parallel horizontal plates that form a part of the aperture taken along line 5—5 shown by illustration in FIG. 3;

FIG. 6 is a sectional view which illustrates a drive mechanism for the parallel vertical plates that form a part of the aperture taken along line 6—6 as illustrated in FIG. 3;

FIG. 7 is a sectional view along 7—7 shown in FIG. 2 which illustrates a cross section of one set of the horizontal plates that form a portion of the aperture;

FIG. 8 is another sectional view which illustrates a cross section of a different view of the horizontal plates taken along line 8—8 shown in FIG. 2;

FIG. 9 is a sectional view along line 9—9 shown in FIG. 2 which illustrates a cross-sectional view of the vertical plates;

FIG. 10 illustrates a ray-tracing diagram of a record illustrating the generation of a virtual point object by deflection of an ion beam in a cylindrically symmetric magnetic field by use of the drive mechanism of this invention;

Figure 1:
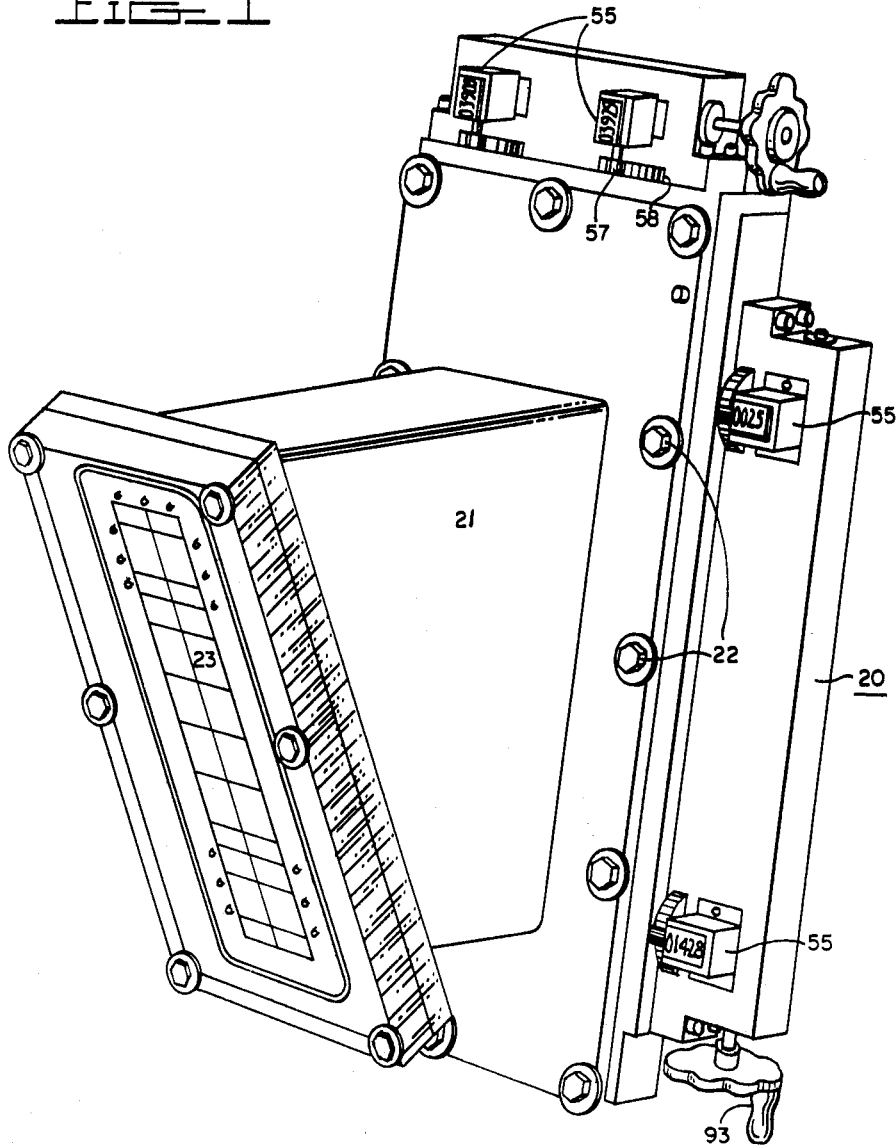
FIG. 1 illustrates an oblique view of a ray tracing device which makes use of the drive device of this invention.

FIG. 11 illustrates a ray-tracing diagram of a record illustrating the image formed at the output of a doublefocusing magnetic spectrometer; and FIG. 12 illustrates a ray-tracing diagram of a record which illustrates the position of an image plane at the output of a double-focusing spectrometer with the magnetic field fixed and with different energy charged particle beams obtained through use of the aperture forming device of this invention.

The ray-tracing apparatus comprises a slit box and a graduated quartz plate suitable secured together and adapted to be connected to the output of a focusing system. The slit box comprises two sets of parallel plates, each having a plurality of movable plates with the outer edges of oppositely disposed plates defining vertical and horizontal slits at right angles to each other to form a rectangular aperture or slit. The plates are adjustable for position, length, and width of the aperture by a screw arrangement which can make adjustments directly in thousandths of an inch. The gearing arrangement permits a movement of the aperture in a vertical or horizontal direction without varying the size of the aperture in transit and if the size is varied or changed the center position will remain the same. The extent of travel of the horizontal and vertical plates is such that a rectangular aperture can be positioned anywhere within an eight inch by 1.750 inch area. The quartz plate can either be tilted at an angle or positioned parallel to the aperture, and is constructed to provide a target area of eight inches by 1.750 inches.

Now referring to the drawings, there is shown by illustration a ray-tracing apparatus, FIG. 1, and in FIG. 2 a drive means suitable for carrying out the teaching of the present invention. The apparatus includes a housing 20 which contains the drive mechanisms and the adjustable horizontal and vertical plates. A rectangular extension 21 is secured to the housing by suitable bolts 22 which also secures the apparatus to an ion producing device or any other suitable apparatus. A quartz plate 23 graduated in 0.10 in. x 0.10 in. squares is secured to the front of the rectangular extension at any desired angle and produces a fluorescent spot when struck by a high velocity ion beam. The aperture formed by the drive means of this invention through which the beam passes is formed by two sets of horizontal plates 24 and two sets of vertical plates 25 wherein each set pair is parallel to each other. The horizontal plates are moved relative to each other by parallel threaded screws 26, 27 which have the same number of threads unit length and are rotated by drive means 28. Each set of horizontal plates, FIGS. 7 and 8, is provided with one plate 31 which is provided with a threaded sleeve 32 at one end and a bifurcated end 33 at the other end which parallels the screws 26 and 27. The threaded sleeve 32 of one set matches with the thread of screw 26 whereas the sleeve of the other set matches with the thread of screw 27. The bifurcated end paralleling the sleeve ends fits around the opposite screw such that as the plates are moved by their screw thread sleeve end by their respective screw, the bifurcated end acts as a guide along the opposite screw and prevents rotation thereof. Thus, the leading edge of plate 31, when moved, will be perpendicular to the screws 26 and 27. A thin flat plate 34 is secured to the leading edge of the plate 31 in order to define a precise straight edge to form one part of an aperture. The other edges of the aperture are formed by vertical plates which will be described in more detail later.

The sets of horizontal plates are represented by FIGS. 7 and 8 which will illustrate different cross-sectional views of one set. Each set of horizontal plates comprises six telescoping plates 31, and 35–39 which are positioned one over the other with each plate connected with its adjacent plate by rivets 41. Each plate is provided with two countersunk holes 42 near their trailing edge; except the uppermost plate 39, and with parallel slots 43, except plate 31, wherein the slots extend substantially across the length of each plate parallel to the threaded sleeve 32. Rivets 41 pass through the holes in the lower plate upwardly through the slot 43, FIG. 2, in the adjacent upper plate and are secured with a loose fit such that the rivets will ride along the slots without moving the plate until the rivets reach the end of the run of the slots. Adjacent plates are connected to each other in this manner such that the plates can be moved successively relative to each other. The uppermost plate 39 is secured at the trailing edge to the housing by screws 44 such that the plate 39 will not be moved by its lower adjacent plate 38. The plates have sufficient length such that when all plates are extended to the maximum permitted by its adjacent upper plate, they will cover the entire housing opening. This will permit forming an aperture anywhere within the housing opening when coupled with the vertical sets of plates which operate in the same manner. In moving the plates of each set to form a slit, the bottom plate 31 of each set of parallel plates is moved by rotating the screws 27 and 26 in opposite directions in their respective threaded sleeves while the bifurcated ends act as guides about the opposite screw. Thus, one bottom plate is moved by one screw 26 or 27 and guided by the other screw during its movement along the screw which passes through the screw threaded arm. As the plates 31 move toward each other the rivets 41 move along the parallel slots 43 in the adjacent plate until the rivets reach the end of the run of the slots. When the rivets in one plate reach the end of the run of the slots in the adjacent upper plate, the adjacent upper plate will begin to move therewith relative to its adjacent upper plate, etc., until the bottom plates 31 of each set meet at the center of the opening in the housing. Thus, the bottom plates can be adjusted for any spacing therebetween from zero to eight inches between the bottom plates of each set with a width in the horizontal direction of 1.750 inches which is limited by the plates that are positioned with their leading edges extending in a vertical plane. After setting the proper spacing between the horizontal plates, the drive wheel can be shifted such that the screws 26 and 27 rotate in the same diretcion, thereby shifting the plates together at the same rate, maintaining the same set spacing. The plates can be shifted together over the entire length of the opening while maintaining the set spacing.

The drive device is provided with two sets of plates in the vertical plane which are adjustable relative to each other to form a spacing between the upper plates in a horizontal direction of from zero to 1.750 inches with a slit that extends in the vertical direction for a length of eight inches, and limited by the plates in which the leading edge extends in the horizontal plane. The sets of plates that form the vertically extending slot comprise three plates, FIGS. 4 and 9, a bottom plate 45 which is secured at one end to the housing, a middle plate 46, and an upper plate 47. The middle and bottom plates have parallel slots therein within which rivets 41 ride to hold the plates together and to enable the upper and middle plates to be moved relative to the bottom plate to form a vertical slit of a specific width. The upper plate 47 of each set is provided with an arm or sleeve 48 on one side which has a screw threaded opening 51 therethrough and a bifurcated side 52 parallel thereto. These sets of vertical plates are adjusted relative to each other to form a slit of a specific spacing when screws 53 and 54 similar to screws 26 and 27 are rotated in opposite directions and then when the drive mechanism is shifted and the screws are rotated in the same direction, the plates can be moved simultaneously in the same direction such that a slit of a specific spacing can be moved anywhere across the 1.75 inch opening.

The plates forming the horizontal slit and the plates forming the vertical slit can be moved separately across their respective opening spacing in the housing to form a rectangular opening of any size between the dimensions of 1.75 inch by 8 inches. The spacing between the respective sets of plates can be determined by counters 55 which indicates the movement of each plate in thousandths of an inch by rotatable indicator wheels 56, FIG. 2, such as an odometer. Each of the indicator wheels are graduated in tenths to represent one thousandth of an inch movement of each plate. The counter is provided with a drive gear 57, FIGS. 4, 5 and 7 which is driven by a gear 58 which is secured to the shank of a threaded screw. Each threaded screw is provided with a counter 55 which indicates the movement of each set of plates moved by their respective screw, 26, 27, 53 or 54. As shown in FIG. 2, each set of plates is separated for their maximum spacing. As such, one counter for the horizontal plates indicates 00000 and the counter for the other set of horizontal plates indicates 08000, this indicates that the two sets of plates are at their maximum spacing of eight inches. Likewise, the two sets of vertical plates are set for their maximum spacing of 1.75 inches which is represented by their respective counters that indicate 00000 and 01750. In forming a slit of a particular size, say 0.030 inch the sets of vertical plates are moved toward each other until one counter reads 890 and the other reads 860, the differences indicate the spacing between the two to be 0.030 inch. Therefore, a slit of 0.030 inch extends the entire length of eight inches across the housing opening. Likewise, the horizontal sets of plates are moved toward each other until the reading on one counter is 4015 and the reading on the other counter is 3985, the difference giving the spacing between the horizontal plates of 0.030 inch which extends across the entire width of 1.750 inches across the housing opening. Since the slits formed by the vertical and horizontal plates cross each other, an aperture of 0.030 inch by 0.030 inch is formed at the center of the housing opening. Now, suppose the beam to be detected is located in the second quadrant of the housing opening and the same sized slit is desired, then the hand drive mechanisms are shifted such that the vertical and horizontal plate drive screws of each respective plate sets are rotated in the same direction. Rotating the drive screws of each respective set in the same direction moves the vertical slit over and across the second and third quadrants while maintaining the slit at the same spacing of 0.030 inch, whereas the horizontal plates are moved together upwardly across the first and second quadrant. The spot where the slits intersect as formed by the vertical and horizontal slits forms a 0.030 inch by 0.030 inch slit or aperture in the second quadrant. The exact position of the aperture can be determined by noting the reading on the counters for the vertical and horizontal plate sets and comparing this with the maximum distance of the travel of the plates. By leaving the horizontal plate sets set at the above position, the position of the aperture can be changed along a line in the first and second quadrants by moving the vertical plates. Also, by leaving the vertical plates set at the above position in the second quadrant, the horizontal plates can be moved simultaneously and the slit aperture can be changed to any place along the vertical slit in the second and third quadrants. By first setting the slit spacing at the desired width by rotating the respective screws in opposite directions and then shifting the drive shaft, a slit of the desired size can be positioned anywhere within the area bounded by the housing opening, that is, over the entire area of 1.75 inches by eight inches as shown in FIG. 2.

Each of the drive screws 26, 27, 53 and 54 (FIGS. 4 and 5) are journaled in a bearing 61 at one end and is provided with a shaft 62 at the other end which extends through the housing and is provided with a bearing 63 which is held in place by a snap ring 64. The snap ring 64 seats in a slot 65 in the housing. An O-ring 66 is positioned between the bearing and the housing to provide a vacuum seal. Each drive shaft has secured thereto by suitable pins 67 a gear wheel 58 for driving the counters 55 and a driven gear 68 for rotating the drive screw. The driver gear is provided with gear teeth thereon set at about a 45° angle to the shaft to match with suitable driver gears. Each set of drive screws for the horizontal and vertical plates are driven by similar drive means which includes a two piece drive shaft positioned perpendicular to each set of drive screws and across the shaft end of the screws. The drive shaft passes through bearings 71, 72 and 73 which are press fitted into openings 74 in the drive housing, and prevented from passing through the opening by a lip 75. Bearing 71 is secured in position by a retainer ring 64 which prevents the bearing from being knocked loose during operation. Each drive shaft is made with a fixed section 76 which is held against any axial movement and a section 77 which is secured for axial movement. The two sections 76 and 77 are secured together by a coupling 78 which is secured to drive section 76 by screws 81 and is provided with a slot 82 parallel with the drive section 77. A screw 81 is passed through the slot 82 and secured in drive section 77 to permit axial movement of the drive section 77 relative to the coupling and fixed section 76. The axially movable drive section 77 is provided with suitably spaced notches 83 therein and the coupling 78 is provided with a ball 84 held in place by a leaf spring 85 secured in place by screws 86 which combines to form a detent mechanism to hold the axially movable shaft in one of two different positions. The drive section 76 is held against any axial movement by the coupling at one end and by a retaining ring 87 at the other end, also, the coupling and retaining ring will prevent bearing 72 and 73 from coming loose from their mounting. Each drive section 76 is provided with a drive gear 88 which is in constant mesh with the driven gear 68 on screws 27 and 54, whereas the axially movable drive section 77 is provided with two drive gears 91 and 92 spaced such that when the detent is in one notch, such as shown, each drive gear 92 of the respective drive shafts will be meshed with a driver gear 68 on screw 26 and screw 53 and when the drive section is moved axially such that the detent is matched with the other notch, each drive gear 91 will be meshed with driven gear 68. The axially movable drive section is constructed such that either drive gear 91 or 92 will be meshed with gear 68 at all times depending on the direction of rotation of the screws desired. Each drive gear 92 will rotate screws 26 and 53 in an opposite rotational direction from screws 27 and 54 respectively when meshed in drive position, whereas each drive gear 91 will drive gear 68 and screws 26 and 53 in the same rotational direction as screws 27 and 54 respectively when meshed therewith. When each pair of screws are rotated in opposite rotational directions the horizontal or vertical plates will be moved toward or away from each other depending on the direction in which the screws are rotated and when the screws are rotated in the same rotational direction the parallel or vertical plates will be moved in the same direction while maintaining the same spacing therebetween as the plates are moved simultaneously. The drive gears are driven by a hand operated wheel 93 as shown or by any other suitable drive means.

In operation, the slit forming device, as described, can be used for determining a virtual point object of a charged particle beam generated by deflecting the beam in a cylindrically symmetric magnetic field. The ray-tracing apparatus including the drive means is positioned at the output of the magnetic field of an accelerator as shown in FIG. 1 and evacuated along with the system. An aperture opening of 0.030 inch by 0.030 inch is formed by adjustment of the plates and positioned to transmit the incident ion-ray. This accurately determines one point in the trajectory of the ion ray. A second point is determined by a fluorescent spot produced when the ray strikes the quartz plate which is graduated in 0.10 inch squares to produce a calibrated grid surface. The two points then determine the trajectory of the ion-ray. The measurement for different rays is repeated several times to obtain the desired focal characteristics by moving the aperture about in the field and recording the point of the aperture setting as well as the fluorescent spot for each setting. From the knowledge of the relative spacing and orientation of the slit box and quartz plate it is possible to draw a given ion trajectory and to determine the object size of the beam. FIG. 10 illustrates the ray-tracing diagram illustrating the generation of the point object by deflection of the ion beam in a cylindrically symmetric magnetic field as pointed out above by use of the drive means forming the aperture which is moved in the reference plane.

FIG. 11 illustrates a ray-tracing diagram made by the drive means of the invention showing the image formed at the output of a 180° double-focusing magnetic spectrometer, the deflection angle being that produced by the object generating magnet. The device determines the position and size of the image, enables one to relate the aberrations to the magnitude of the acceptance solid angle of the spectrometer and to the incident beam energy which enables adjustment of the spectrometer for highest resolving power consistent with the desired acceptance solid angle. Also, the image plane of the spectrometer can be determined by this drive means.

With the magnetic field in the spectrometer fixed, objects generated with different energy beams will, over a limited range, be brought to focus at different points along a plane called the image plane. FIG. 12 illustrates such an image plane located with the ray-tracing device.

In use of the drive means a method of illustrating the ion trajectory has been simplified by making an accurate scale drawing, in one plane, showing the positions of the slit box and quartz plate accurately marking the corresponding graduations thereon and then reproducing the drawing to form graphic copies. These copies then serve as a graph paper for plotting the ray-tracing data directly on the graph paper. The ray-tracing data being that obtained from the aperture position indicated by the counters and the fluorescent spot made on the quartz plate by the ray striking the plate. A line drawn between the two points and extended will intersect with other such lines to indicate the focal point of the images produced by the focusing system. In such a manner, rapid and accurate location of the image or image plane of a lens system can be determined by use of the drive means which forms the aperture.

Obviously many modifications and variations of the present invention are possible in the light of the above teachings. It is therefore to be understood that within the scope of the appended claims the invention may be practiced otherwise than as specifically described.

What is claimed is:

1. A device for forming an aperture of a particular size and moving said aperture to different positions while maintaining the same aperture dimensions which comprises a horizontal drive shaft means comprising first and second axially aligned drive sections, a coupling connecting said axially aligned drive sections with said first drive section axially movable relative to said coupling and said second drive section, said coupling including a detent mechanism associated with said first drive section for securing said first drive section in one of two axial positions, a drive gear secured to said second drive section of said drive shaft means, a pair of spaced drive gears secured to said first drive section with the drive teeth on said spaced drive gears facing each other, first and second vertical parallel driven screws positioned at right angles to said horizontal drive shaft means, a driven gear secured to each of said parallel driven screws, said driven gear on said first driven screw being positioned between said pair of drive gears on said first drive section of said drive shaft means in driving contact with one gear of said pair, said driven gear on said second screw being positioned in driving engagement with said driving gear on said second drive section of said drive shaft means, a vertical drive shaft means similar to said horizontal drive shaft means adapted to drive first and second horizontal drive screws similar to said first and second vertical parallel driven screws, each of said horizontal and vertical drive shaft means adapted to respectively drive said first and second driven screws associated therewith in opposite directional rotation when said first drive section of each respective drive shaft means is in one position and adapted to drive said first and second driven screws respectively in the same rotational direction when said first section of each respective drive shaft is in the other of said two axial positions, a pair of horizontal slit forming means secured relative to said first and second vertical driven screws in parallelism relative to each other and adapted to be driven in opposite directions relative to each other by and along said first and second vertical driven screws when driven by said horizontal drive shaft means and a pair of vertical slit forming means secured relative to said first and second horizontal driven screws in parallelism relative to each other and adapted to be driven in opposite directions relative to each other by and along said first and second horizontal driven screws when driven by said vertical drive shaft means.

2. A device as claimed in claim 1 wherein each pair of vertical and horizontal slit forming means which includes two oppositely disposed groups of a plurality of telescoping plates, each group of said telescoping plates comprising one plate having a screw threaded end and a bifurcated end, said screw threaded end of said plate adapted to be threaded along one of said parallel driven screws an said bifurcated end adapted to slide along the other of said parallel driven screws as said parallel screws are rotated by their respective drive shafts, said groups of plates forming perpendicular slits which form an aperture of a specific dimension as determined by the widths of the slits formed by said groups of plates.

3. A device as claimed in claim 2 which includes counters operated by a driven gear connected thereto and positioned relative to and operated through rotation of said vertical and horizontal parallel screws to indicate the spacing of the slits formed by said groups of plates.

References Cited by the Examiner
UNITED STATES PATENTS

| | | | |
|---|---|---|---|
| 1,063,874 | 6/1913 | Hall | 74—355 |
| 1,330,740 | 2/1920 | Mills | 74—355 |
| 2,911,537 | 11/1959 | Land | 250—105 |
| 3,048,700 | 8/1962 | Koerner et al. | 250—105 |

JEWELL H. PEDERSEN, *Primary Examiner.*

ROLAND L. WIBERT, *Assistant Examiner.*